2,813,837
MANUFACTURE OF PURIFICATION CATALYSTS

Donald L. Holden, Riverside, Ill., assignor to Universal Oil Products Company, Des Plaines, Ill., a corporation of Delaware No Drawing. Application June 16, 1954,
Serial No. 437,279

3 Claims. (Cl. 252—465)

This invention relates to an improvement in the manufacture of purification catalysts and to the use of these improved catalysts in effecting purification of organic compounds.

Organic compounds and particularly hydrocarbon fractions contain impurities including sulfur, nitrogen, oxygen, etc., in a combined form as, for example, the sulfur may be present in the form of mercaptans, the nitrogen as alkyl amines or heterocyclic nitrogen compounds, etc. For various reasons, it is important to remove these impurities from the hydrocarbon fractions, and the present invention is directed to a novel method of manufacturing catalysts for such use and to the use of these improved catalysts in removing the impurities from hydrocarbon fractions or other organic compounds.

In the manufacture of the purification catalysts, it has been found that improved results are obtained when the support is subjected to high temperature calcination prior to impregnation thereof with the other components of the catalyst. However, when the other components of the catalyst are introduced as acidic solutions, it has been found that uniform impregnation of the calcined support by the impregnating solution is not obtained. This apparently occurs because of the acidic solution strongly attacking the outer portions or surfaces of the support and becoming so expended in all constituents that none of them reaches the inner cores of the support. Various techniques have been employed in order to temper such reactions. For example, in one method the acidic solution has been cooled and commingled with the support at the lower temperature in order to avoid the strong reaction of the acidic solution with the support. In another method, salts have been used in place of the acid in order to temper the strong reaction. In still other cases, dilute solutions of acids have been employed. While these methods may help, in many cases they do not result in uniform impregnation of the support. It has now been found that uniform impregnation may be obtained and the strong reaction of the acidic solution with the support may be tempered by subjecting the support, after such high temperature treatment and prior to commingling the acidic solution therewith, to a particular treatment in the manner to be hereinafter set forth.

In one embodiment the present invention relates to a method of preparing a purification catalyst which comprises calcining an inorganic oxide support, hydrating said support, and thereafter impregnating the same with an acidic solution containing a molybdenum compound and a compound of a member of the iron group.

In a specific embodiment the present invention relates to a method of preparing a purification catalyst which comprises forming alumina into particles of definite size and shape, calcining said particles at a temperature of from about 600° to about 1600° F., hydrating the calcined particles to a moisture content within the range of from about 1 to about 10% by weight, and thereafter impregnating the same with an acidic solution of a molybdenum compound and a cobalt compound.

As hereinbefore set forth, hydration of the inorganic oxide support after high temperature treatment serves to temper the strong reaction of the acidic solution and results in uniform penetration of the acidic solution throughout the support particles. As will be shown in the examples appended to the present specifications, uniform impregnation of the catalyst results in improved results during use in the processing of organic compounds and particularly hydrocarbons.

Any suitable inorganic oxide support may be employed. Alumina appears to be particularly preferred. Other inorganic oxide supports include the oxides of silicon, magnesium, zirconium, titanium, hafnium, thorium, zinc, etc. In many cases, mixtures of inorganic oxides are utilized including, for example, composites as silica-alumina, silica-zirconia, silica-alumina-zirconia, silica-magnesia, silica-alumina-magnesia, alumina-magnesia, alumina-zinc oxide, alumina-zirconia, alumina-titania, zinc oxide-zirconia, etc. The inorganic oxide or oxides may be synthetically prepared or naturally occurring. The synthetically prepared oxides generally are manufactured by commingling a suitable basic compound, including ammonium hydroxide, ammonium carbonate, etc., with an acidic compound of the metal corresponding to the inorganic oxide, including the chloride, bromide, iodide, fluoride, sulfate, phosphate, nitrate, acetate, etc., or by the addition of a suitable acidic compound, including hydrogen chloride, sulfuric acid, phosphoric acid, etc., to an alkaline compound of the metal as, for example, sodium aluminate, etc. The resultant hydroxide of the metal or metals usually is washed to remove soluble impurities and then is dried at a temperature of from about 200° to about 600° F. for a period of from 1 to 24 hours or more. In one method, the dried inorganic oxide is formed into particles of definite size and shape in any suitable manner, including grinding, pelleting, extruding, etc., and then is subjected to calcination at a temperature of from about 600° to about 1600° F. In another embodiment the inorganic oxide or oxides may be formed in spherical shape by dropping a suitable sol thereof into a suitable medium which may comprise air, an inert atmosphere as, for example, nitrogen, CO, etc., or into an oil or other suitable immiscible liquid. The resultant spheroids are then washed, dried and calcined in the manner hereinbefore set forth. Naturally occurring inorganic oxides include, for example, clays such as feldspar, bauxite, kaolin, fuller's earth, kieselguhr, montmorillonite, bentonite, Attapulgus clay, etc., which generally are acid or otherwise treated.

Regardless of the inorganic oxide or oxides and regardless of the specific method of preparing the same, the inorganic oxide or oxide composite is subjected to calcination as hereinbefore set forth. After such calcination, the inorganic oxide is subjected to a hydration treatment in order to sufficiently wet the support so that its subsequent commingling with the acidic solution will result in uniform impregnation of the support. The hydration treatment may be effected in any suitable manner and preferably is to an extent sufficient to raise the moisture content of the support to at least 1% and generally within the range of from about 1% to 10% or more and preferably from about 3 to about 8% by weight. A satisfactory method of hydrating the support is to maintain the support in contact with humid air for several hours. This may be effected by placing the support particles in trays, alternated with trays of water, all disposed in a drying oven or other enclosure equipped with a blower. In another embodiment, the support particles may be soaked in a bath of water. In still another method, water may be sprayed or poured over the particles. Still another method comprises subjecting the support to steaming. It is understood that the duration of the treatment will be sufficient to effect the desired hydration of the support. Depending upon the particular method employed, the hydration may be effected at atmospheric or elevated temperature.

When desired, a wetting agent may be employed during the hydration in order to facilitate the desired wetting of the support particles. Representative wetting agents include fatty acids saponified with amines or amino alcohols, long chain alcohols containing 10 to 18 carbon atoms, salts of sulfated fatty alcohols containing from about 10 to 18 carbon atoms, salts of fatty acid amides, salts or sulfated esters of fatty acids, alkyl sulfonates containing from about 8 to 20 carbon atoms in the alkyl group, aryl and/or alkaryl sulfonates, sorbitan laurate, sorbitan palmitate, sorbitan stearate, sorbitan oleate, etc. When desired mixtures of these wetting agents may be employed.

After hydration of the support in the manner hereinbefore set forth, the support will be composited with an acidic solution.

The purification catalyst comprises the support, a molybdenum compound and a compound of a member of the iron group, including cobalt, nickel or iron and mixtures thereof. A preferred catalyst comprises a composite of alumina, cobalt oxide and a molybdenum oxide. One method of preparing this catalyst comprises forming an acidic impregnating solution of cobalt compound, particularly cobalt nitrate hexahydrate, and of a molybdenum compound, particularly molybdic acid, and to commingle this impregnating solution with the alumina particles. When desired, a suitable acid, including nitric acid, hydrochloric acid, phosphoric acid, oxalic acid, etc. or mixtures thereof may be added to the impregnating solution. In a preferred method, the alumina pills or spheres are dipped or soaked in the impregnating solution. It is understood that any other suitable method of commingling the alumina particles with the impregnating solution may be employed.

In still another embodiment, separate impregnating solutions of the molybdenum compound and of the cobalt compound are prepared and are composited successively with the support and other components, either with or without intervening heating of the support. In general, it is preferred to composite the molybdenum component first and then the cobalt component, although the reverse procedure may be employed.

It is understood that other suitable compounds of cobalt may be employed including, for example, cobalt ammonium nitrate, cobalt ammonium chloride, cobalt ammonium sulfate, cobalt bromide, cobalt bromate, cobalt chloride, cobalt chlorate, cobalt fluoride, cobalt fluorate, etc. Similarly other siutable compounds of molybdenum may be employed. Other soluble compounds of molybdenum include molybdenum trioxide, molybdenum tetrabromide, molybdenum oxydibromide, molybdenum tetrachloride, molybdenum oxydichloride, molybdenum oxypentachloride, molybdenum oxytetrafluoride, etc.

The impregnation solution will contain the cobalt and molybdenum compounds in the proportions desired in the final catalyst, and the impregnation will be controlled to produce a final catalyst containing these components in the desired concentrations. The concentrations of the cobalt and molybdenum compounds may each range from 1% to 25% by weight of the final catalyst. Preferred catalysts contain the cobalt in a concentration from about 1% to about 10% and the molybdenum in a concentration of from about 2% to about 20% by weight of the final catalyst. After impregnation, the final composite generally is dried at a temperature of from about 200° to about 600° F. for a period of from about 2 to 24 hours or more and calcined at a temperature of from about 600° to about 1200° F. for a period of from about 1 to 12 hours or more.

While alumina apears preferred as the support it is understood that other inorganic oxide supports may be employed, including those synthetically prepared and naturally occurring as hereinbefore set forth. Furthermore, it is understood that the catalyst may contain nickel and/or iron compounds in place of or in addition to the cobalt compound. These other catalysts are prepared in substantially the same manner as hereinbefore set forth except that soluble compounds of nickel and/or iron will be used including, for example, nickel acetate, nickel benzenesulfonate, nickel bromate, nickel bromide, nickel perchlorate, nickel chloride, nickel fluoride nickel fluosilicate, nickel iodide, nickel nitrate, nickel sulfate, etc. Soluble salts of iron include ferrous acetate, ferrous bromide, ferrous perchlorate, ferrous chloride, ferric dichlorate, ferrous fluosilicate, ferrous iodide, ferrous lactate, ferrous nitrate, ferric nitrate, ferrous oxalate, ferric oxalate, ferrous sulfate, etc.

The nickel and/or iron compounds generally will be used in a concentration of from 1 to 25% by weight. When two or more of these components are used the total concentration thereof generally will be within this range.

Illustrative purification catalysts of the present invention include alumina-molybdenum oxide-cobalt oxide, alumina-molybdenum oxide-nickel oxide, alumina-molybdenum oxide-iron oxide, alumina-molybdenum oxide-cobalt oxide-nickel oxide, alumina-molybdenum oxide-cobalt oxide-iron oxide, alumina-molybdenum oxide-nickel oxide-iron oxide and alumina-molybdenum oxide-cobalt oxide-nickel oxide-iron oxide.

Catalysts containing mixed supports include silica-alumina-molybdenum oxide-cobalt oxide, silica-zirconia-molybdenum oxide-cobalt oxide, silica-magnesia-molybneum oxide-cobalt oxide, silica-alumina-magnesia-molybdenum oxide-cobalt oxide, silica-alumina-zirconia-molybdenum oxide-cobalt oxide, silica-alumina-molybdenum oxide-nickel oxide, silica-alumina-zirconia-molybdenum oxide-nickel oxide, etc. It is understood that these various catalyst compositions are not necessarily equivalent.

In another embodiment of the invention the catalyst containing molybdenum and cobalt, nickel and/or iron may be used in the sulfide form. Sulfidation of the oxide catalyst may be effected in any suitable manner. In one method this is accomplished by passing hydrogen sulfide or other sulfur containing compounds through the composite at a temperature of from about 500° to about 1000° F. until sulfidation is complete. Complete sulfidation is reached when there is no further absorption of hydrogen sulfide or other sulfur containing compounds. In another method, the sulfidation may be acomplished by utilizing the catalyst to process hydrocarbons or other organic compounds containing sulfur impurities and effecting the sulfidation in situ.

In some cases the purifying catalysts may contain combined halogen and particularly fluorine and/or chlorine. When fluorine is to be incorporated in the catalyst, a preferred method is to form a hydrogen fluoride solution of the cobalt and molybdenum or other compounds and to use this impregnating solution to composite these components with the alumina and/or other inorganic oxide support. In another method, the fluorine and/or other halogen may be composited with the alumina or other inorganic oxide support, and the other components thereafter composited with the inorganic oxide-halogen composite. The halogen generally will be used in a concentration of from about 1% to about 20% by weight of the final composite, although higher or lower concentrations may be utilized when desired.

When employed for the purification of hydrocarbon fractions, including gasoline, naphtha, aromatic solvent, kerosene, diesel fuel, gas oil, fuel oil, transformer oil, lube oil, etc., or mixtures thereof, the catalyst hereinbefore set forth generally will be utilized at a temperature of from about 400° to about 800° F. and a pressure of from atmospheric to 2000 pounds or more, preferably in the presence of hydrogen, the hydrogen being utilized in a molar ratio to hydrocarbon of from about 0.5:1 to about 20:1. In some cases, the catalyst hereinbefore set forth may be utilized for effecting reforming of gasoline or naphtha fractions or for a combination of purifying and reforming, the reforming being defined as the treatment of gasoline or naphtha fractions to improve the antiknock characteristics thereof. The purifying-reforming generally is effected at a temperature of from 800° to 1100° F., and a pressure of from about 100 to 2000 pounds or more, in the presence of hydrogen in a mol ratio of from about 0.5:1 to 10:1 or more.

Purification of the hydrocarbon or other organic compound may be effected in any suitable manner, including a fixed bed type of operation in which the charge is passed at the desired temperature and pressure through the catalyst, in either upward or downward flow, and the effluent therefrom is fractionated or otherwise treated to recover the desired product and to recycle unconverted products. When the process is effected in the presence of hydrogen, it may be preferred to recycle at least a portion of the excess hydrogen for further use in the process. In place of the fixed bed operation, other operations may be used including the fluidized type in which the charge and catalyst are maintained in turbulent flow within the reaction zone, the slurry or suspensoid type of operation in which the catalyst and charge are transported as a slurry into the reaction zone, the moving bed type of process in which the catalyst moves as a mass either concurrently or countercurrently to the charge, etc.

Although the catalyst of the present invention will have a long life, it may require regeneration after a long period of service, and the regeneration may be effected in any suitable manner. In one method, regeneration of the catalyst may be effected by burning carbonaceous deposits with air or other oxygen-containing gas. In some cases, regeneration of the catalyst may be effected by treatment at high temperatures with hydrogen or other gases, and in other cases both of these methods may be employed.

The following examples are introduced to further illustrate the novelty and utility of the present invention, but not with the intention of unduly limiting the same.

EXAMPLE I

The catalyst used in this example comprised alumina, 6% by weight of combined fluorine, 6% by weight of molybdenum oxide and 1% by weight of cobalt oxide. The catalyst was prepared by the general method of forming a solution of molybdic acid and cobalt nitrate hexa-hydrate in hydrofluoric acid and using this solution to impregnate alumina pills which previously had been calcined at 1200° F. With the exception of one sample the alumina pills were hydrated to various moisture contents by placing trays containing the alumina in a drying oven, alternating with trays of water. A blower connected to the drying oven was operated at room temperature in order to maintain the desired humid atmosphere in the oven.

In the preparation of catalyst A, the control sample, the alumina was not hydrated prior to compositing the other components therewith. The alumina pills had a moisture content of 0.85% by weight. These pills were highly colored on the outside and, when split open, showed poor penetration of the color to the interior of the catalyst.

Catalyst B was prepared in accordance with the features of the present invention. The alumina pills were hydrated for a period of 2 hours to a moisture content of about 4% by weight. The catalyst pills had a very light color on the outside and, when split open, showed a uniform color throughout.

Catalysts A and B were each separately utilized for the purification of a California cracked naphtha at a temperature of about 700° F. and a pressure of about 800 pounds, in the presence of hydrogen in an amount of about 2000 cubic feet per barrel of naphtha. The reductions in sulfur, bromine number and basic nitrogen are shown in the following table:

*Table I*

| Catalyst | Percent Reduction In— | | |
|---|---|---|---|
| | Sulfur | Bromine No. | Basic Nitrogen |
| Catalyst A (Control) | 83 | 70 | 59 |
| Catalyst B (alumina hydrated) | 85 | 75 | 65 |

It will be noted that catalyst B (hydration of the alumina before impregnation) had a uniform physical appearance and resulted in improved purification of the naphtha as compared to catalyst A (alumina not hydrated).

EXAMPLE II

A purification catalyst is prepared by calcining synthetically prepared silica-alumina pills at a temperature of 1550° F., and thereafter hydrating the pills at a moisture content of 6%. The pills are then impregnated with an acidic solution containing molybdic acid, nickel nitrate and nitric acid. Hydration of the silica-alumina pills prior to impregnation will result in more uniform impregnation of the support by the impregnating solution.

I claim as my invention:

1. A method of preparing a catalyst comprising alumina, a molybdenum compound and a cobalt compound, which comprises forming particles of said alumina, calcining said particles at a temperature of from about 600° to about 1600° F., hydrating the calcined particles to a moisture content of from about 1% to about 10% by weight, and thereafter impregnating the same with an acidic solution of a molybdenum compound and a cobalt compound.

2. A method of preparing a catalyst comprising an inorganic oxide support, a molybdenum compound, a cobalt compound and combined halogen, which comprises forming particles of said support, calcining said particles at a temperature of from about 600° to about 1600° F., hydrating the calcined particles to a moisture content of from about 1% to about 10% by weight, separately forming an acidic solution of a molybdenum compound, cobalt compound and halogen, and thereafter impregnating the hydrated support particles with said solution.

3. A method of preparing a catalyst comprising alumina, molybdenum oxide, cobalt oxide and combined fluorine, which comprises forming particles of said alumina, calcining said particles at a temperature of from about 600° to about 1600° F., hydrating the calcined particles to a moisture content of from about 1% to about 10% by weight, separately forming an acidic solution of molybdic acid, cobalt nitrate and hydrogen fluoride, and thereafter impregnating the hydrated alumina particles with said solution.

References Cited in the file of this patent

UNITED STATES PATENTS

| | | |
|---|---|---|
| 2,331,292 | Archibald | Oct. 12, 1943 |
| 2,378,155 | Newsome | June 12, 1945 |
| 2,422,372 | Smith et al. | June 17, 1947 |
| 2,487,466 | Nahin | Nov. 8, 1949 |
| 2,508,014 | Davidson | May 16, 1950 |
| 2,662,860 | Engel | Dec. 15, 1953 |
| 2,698,305 | Plank et al. | Dec. 28, 1954 |
| 2,739,132 | Riedl | Mar. 20, 1956 |

OTHER REFERENCES

"Comptes Rendus," vol. 233 (1951), pages 1284–1285.